United States Patent [19]

Patel

[11] Patent Number: 4,645,609

[45] Date of Patent: Feb. 24, 1987

[54] SULFONATED ASPHALT/CAUSTICIZED LIGNITE BLEND

[75] Inventor: Bharat B. Patel, Bartlesville, Okla.

[73] Assignee: Phillips Petroleum Company, Bartlesville, Okla.

[21] Appl. No.: 737,365

[22] Filed: May 23, 1985

[51] Int. Cl.$^4$ ............................................... C09K 7/02
[52] U.S. Cl. ..................................252/8.51; 252/8.515
[58] Field of Search ............... 252/8.5 A, 8.5 C, 8.5 P

[56] References Cited

U.S. PATENT DOCUMENTS

| | | | |
|---|---|---|---|
| 2,783,201 | 2/1957 | Rahn | 252/8.5 |
| 3,027,323 | 3/1962 | Stuchell et al. | 252/8.5 |
| 3,028,333 | 4/1962 | Stratton et al. | |
| 3,034,982 | 5/1962 | Monroe | |
| 3,089,842 | 5/1963 | Stratton | |
| 3,352,902 | 11/1967 | Moschopedis | |
| 3,629,105 | 12/1971 | Weiss | |
| 3,738,437 | 6/1973 | Scheuerman | 252/8.5 X |
| 4,385,999 | 5/1983 | McCrary | |
| 4,404,108 | 9/1983 | Cates | |
| 4,420,405 | 12/1983 | McCrary | |

Primary Examiner—Herbert B. Guynn
Attorney, Agent, or Firm—A. L. Robbins

[57] ABSTRACT

A well-working fluid such as a drilling mud containing a mixture of sulfonated asphalt and a causticized lignite. The use of the mixture gives a less expensive composition than would be the case with pure sulfonated asphalt and at the same time results in a higher quality fluid in that foaming is reduced and on balance the rheological properties are improved. The invention is of particular applicability in drilling muds using conventional ingredients such as clays and polymeric thickening agents such as CMC.

15 Claims, No Drawings

SULFONATED ASPHALT/CAUSTICIZED LIGNITE BLEND

BACKGROUND OF THE INVENTION

This invention relates to drilling fluids.

It is known to add sulfonated asphalt to drilling fluids so as to improve the rheological properties thereof. Drilling fluids by their very nature present unique and rather difficult requirements. On the one hand, the fluid must be capable of exhibiting some rather sophisticated performance characteristics such as inhibiting disintegration of cuttings to just the right extent, protecting unstable shales, have lubricating characteristics and a viscosity sufficiently low to allow pumping. On the other hand, any material which is to be injected into a well in large quantities obviously has to be as inexpensive as possible.

The fact is, however, that some of the additives in drilling muds are relatively expensive, as for example, the sulfonated asphalt. It is only natural in almost every technology to try to replace an expensive ingredient with a cheaper one as a filler or extender, this being limited by the extent to which one can tolerate the poorer performance generally imparted by the filler or extender.

SUMMARY OF THE INVENTION

It is an object of this invention to provide a drilling fluid having both lower cost and improved properties; and It is yet a further object of this invention to provide improved methods of forming drilling fluid compositions.

In accordance with this invention, a drilling fluid comprising a sulfonated asphalt is provided in which a portion of the sulfonated asphalt is replaced with a causticized lignite.

DESCRIPTION OF THE PREFERRED EMBODIMENTS

The drilling fluids to which the present invention applies are those conventionally known in the art and encompass aqueous, oil-base or emulsion types. Generally the fluids contain finely divided clays such as bentonites, kaolin or illites and also organo colloids such as sodium carboxymethylcellulose or sodium polyacrylates. Frequently, quebracho is a constituent. Suitable drilling fluids to which this invention can be applied are disclosed in Stratton et al, U.S. Pat. No. 3,028,333 (Apr. 3, 1962) the disclosure which is hereby incorporated by reference.

Sulfonated asphalts are well known in the art and are commercially available. The term "asphalt" refers to the dark semi-solid or solid hydrocarbon material which is completely or substantially soluble in carbon disulfide in which material bitumens are the sole or predominant constituent. Specific examples include asphaltenes, maltenes, blown asphalt, straight residual oils, distillation residues, still bottoms, cracking residues and asphaltic bitumens, for instance. The term "sulfonated asphalt" as herein employed is intended to cover an ammonium or alkali metal sulfonated asphalt that has been sulfonated with a sulfonation agent, such as liquid $SO_3$. Other suitable sulfonating agents include fuming sulfuric acid, chlorosulfonic acid, concentrated sulfuric acid, and sulfur trioxide. Preparation of suitable sulfonated asphalts is disclosed in great detail in said U.S. Pat. No. 3,028,333 patent referred to hereinabove, and in Stratton U.S. Pat. No. 3,089,842 (May 14, 1963) the disclosure of which is also hereby incorporated by reference. Frequently used are asphalts having 0–10 weight percent saturates, 35 weight percent maximum resins, 30–40 weight percent aromatics and 20–30 weight percent asphaltenes.

The term "lignite" is used in the conventional sense to denote that variety of coal which is intermediate between peat and bituminous coal. Preferred lignite used in this invention has an oxygen content of at least about 20 weight percent, usually in the range of from about 20 to about 40 weight percent, measured on a dry basis. Lignitic materials which are high in humic acids, thus readily soluble in basic solution, are most preferred. Presently preferred is Leonardite, which is characterized by its high oxygen content and increased alkali solubility. The solubility of Leonardite is greater than that of conventional lignite. As an example, a typical solubility of conventional lignite is about 68 percent in alkali, whereas Leonardite has a solubility of about 85 percent. All proportions herein are by weight. A typical Leonardite having 85 percent solubility consists of 13.5 percent moisture, 71.5 percent humic acids, and 15 percent residue, whereas lignite of 67.7 percent solubility may have an analysis of 15 percent moisture, 51.7 percent humic acid, and 33.3 percent residue. Leonardite is a soft, earthy, medium brown, coal-like substance associated with lignitic outcrops in North Dakota, South Dakota, Montana and Texas, and is mined commercially. Normal lignite may be converted to a material of similar properties by oxidation and such converted lignite may be used in the preparation of the compositions of this invention. Leonardite has an oxygen content higher than that of other types of lignite, generally about 28 percent to 29 percent oxygen as compared to 10 percent oxygen in lignite. The higher oxygen content of Leonardite is due to the larger number of carboxylic acid groups, which may explain the great increase in alkali solubility of Leonardite as compared to other lignites.

The weight ratio of sulfonated asphalt to causticized lignite is preferably within the range of 3:1 to 1:1, more preferably 2.5:1 to 1.5:1.

The lignite is causticized because the causticized material is readily water-soluble. The lignite should not be present during the sulfonation of the asphalt since such a procedure results in a product in which the lignite sulfonates prior to the asphalt. Subject to these limitations, there are two embodiments to the invention.

In the first embodiment, the uncausticized lignite can be added along with caustic soda to the sulfonated asphaltic composition essentially immediately after formation thereof so as to simultaneously causticize the lignite and neutralize the remaining sulfonic acid. In the second embodiment, the lignite is causticized and either added as such to the slurry of sulfonated asphalt after neutralization or the causticized lignite can be dried and simply blended physically with the dried sulfonated asphalt. The preferred causticizing agent is caustic NaOH although KOH works essentially the same. Causticized lignite is commercially available and can be prepared in the manner known in the art. Suitable methods of causticizing lignite are disclosed in Browning U.S. Pat. No. 3,441,504 (Apr. 29, 1969), the disclosure of which is hereby incorporated by reference.

The composition of this invention can be utilized in drilling fluids in the same concentration as is used for sulfonated asphalt. Generally about 0.1 to about 10 pounds of the sulfonated asphalt/causticized lignite blend of this invention will be utilized per 42 gallon barrel of drilling fluid.

While sulfonated asphalt is an excellent drilling fluid additive for stabilizing shale sections and inhibiting solids dispersion it has a tendency to cause foam in muds and it also increases mud rheology, i.e., plastic viscosity, yield point and gels. As the data hereinbelow disclose the sulfonated asphalt/causticized lignite composition which is inherently less expensive because of the low cost of the lignite, results in a product which enhances rather than detracts from the properties of the drilling fluid. For instance, foaming is greatly reduced, rheological properties are improved on balance and the antifriction properties are essentially unchanged.

EXAMPLE I

This example describes the results of foam tests carried out, respectively, on drilling muds containing Soltex ® additive, a 3:1 wt/wt Soltex ®/causticized lignite blend additive, a 1:1 wt/wt Soltex ®/causticized lignite blend additive and a causticized lignite additive. A foam test was also carried out on the base mud which contained 5 g bentonite per 175 mL of fresh water.

In each test, 3.0 g of the additive was added to 175 mL of base mud and the mixture was stirred for 10 minutes on a Multimixer. The entire mixture was then transferred to a 500 mL graduated cylinder and covered. The initial total volume (volume of mud plus foam) and foam volume were measured immediately and then remeasured after allowing the system to stand for 10 minutes. The results are summarized in Table I.

TABLE I

| | Foam Tests on Drilling Muds (6 ppb of additive) | | | |
|---|---|---|---|---|
| | | Initial Readings | Readings After 10 Min. | |
| Additive | Run No. | Total Vol. | Foam Vol. | Total Vol. | Foam Vol. |
| None (Base Mud)* | 1 | 175 | 0 | 175 | 0 |
| Soltex ®[a] | 2 | 340 | 340 | 335 | 190 |
| 3:1 Additive[b] | 3 | 310 | 205 | 270 | 105 |
| 1:1 Additive[c] | 4 | 255 | 92 | 228 | 55 |
| Causticized Lignite | 5 | 225 | 58 | 215 | 40 |

*Base mud contained 5 g bentonite per 175 mL of fresh water.
[a]Soltex ® is the Phillips trademark for sodium salt of sulfonated asphalt.
[b]Additive blend of 3 parts by weight Soltex ® and 1 part by weight of causticized lignite.
[c]Additive blend of 1 part by weight Soltex ® and 1 part by weight of causticized lignite.

Referring to Runs 3 and 4 in Table I, it is evident that initial and final foam volumes were less than in the Soltex ® system of Run 2 reflecting that the (surface) foams in Runs 3 and 4 broke more quickly (were less stable) than the dispersed ("internal") foam in the system of Run 2. The dispersed foam is evident by equal initial total volume and foam volume. The results of Runs 1 and 5 indicate, respectively, that no foaming was observed in the base mud systems and a relatively small amount of foaming was observed in the causticized lignite system.

In general, foaming is undesirable in drilling muds because it is detrimental to the rheological properties of the mud. The diminished forming property of the mud in Runs 3 and 4 can therefore be considered as a desirable characteristic resulting from the use of the additive blends.

Example II

This example describes lubricity testing of the Soltex ®/causticized lignite blends in drilling muds. Control runs were carried out on the base mud and muds containing either Soltex ® additive (a known lubricity improver) or causticized lignite additive.

In each test, the additive was present in sufficient amount to be equivalent to 6 ppb and the test mixtures were stirred for 10 minutes on a Multimixer. Samples were hot-rolled for 16 hours at 160F and cooled to ambient temperature before determining the coefficient of friction (CF) for each mixture on a Baroid Lubricity Tester. The CF values are defined as the meter dial reading divided by 100 with the proviso that the reading is taken at 60 rpm with 100 in-lb load on the Baroid Lubricity Tester. The results are summarized in Table II.

TABLE II

| | Lubricity Tests on Drilling Muds (6 ppb additive) | | |
|---|---|---|---|
| Additive | Run No. | Coefficient of Friction (CF) | Percent Reduction in CF |
| None (Base Mud)* | 1 | 0.47 | None (Blank) |
| Soltex ®[a] | 2 | 0.28 | 40 |
| 3:1 Additive[b] | 3 | 0.30 | 36 |
| 1:1 Additive[c] | 4 | 0.30 | 36 |
| Causticized Lignite | 5 | 0.32 | 32 |

*The base mud contained 3 weight percent bentonite in deionized water. The mixture was de-sanded by screening through a 150 mesh screen.
[a,b,c]See footnotes a, b and c in Example I (Table I).

Referring to the results in Table II, it is evident that the Soltex ®/causticized lignite blends (see runs 3 and 4) were effective for decreasing the coefficient of friction of drilling muds (improving the lubricity) by about 36% relative to the base mud (run 1) containing no lubricity additive. The control Soltex ® system in Run 2 was about the same or at most only very slightly better (40% reduction in the coefficient of friction) than the additive blends of Runs 3 and 4 as well as the causticized lignite system of Run 5.

EXAMPLE III

This example describes the inhibition testing of the Soltex ®/causticized lignite blends in drilling mud. Control runs were carried out on the base mud and muds containing either Soltex ® (a known clay inhibitor, i.e., inhibits clay particles from dispersing) or causticized lignite additive (a known dispersant).

In each laboratory test, the additive was added to 350 mL of base mud in sufficient quantity to be equivalent to 6 pounds of additive per barrel of base mud. Sample mixtures were stirred 10 minutes on a Multimixer before adding the equivalent of 15 ppb of untreated bentonite. After stirring the samples for 10 minutes, additional untreated bentonite was added to increase the bentonite level by an equivalent of 25 ppb in the base mud. The samples were stirred an additional 10 minutes, cooled to ambient temperature, and tested. The results are summarized in Table III.

TABLE III

Inhibition Tests in Drilling Muds
(6 ppb additive)

| Additive | Run No. | PV$^d$ | YP$^e$ | Gels$^f$ | pH |
|---|---|---|---|---|---|
| Base Mud* | 1 | 3 | 0 | 1/1 | 8.8 |
| Base Mud** | 2 | 30 | 61 | 38/69 | 8.9 |
| Soltex ®$^a$ | 3 | 9 | 12 | 16/17 | 9.0 |
| 3:1 Additive$^b$ | 4 | 9 | 8 | 4/10 | 8.9 |
| 1:1 Additive$^c$ | 5 | 9 | 4 | 2/6 | 8.9 |
| Causticized Lignite | 6 | 10 | 4 | 1/2 | 8.9 |

*Base mud was 2 weight percent untreated bentonite in deionized water.
**Equivalent of 25 ppb (pounds per 42 gallon barrel) of untreated bentonite was added to the base mud of run 1 which formed the base mud for the following runs.
$^{a,b,c}$See footnotes a, b and c in Example I (Table I).
$^d$PV represents Plastic Viscosity, centipoise.
$^e$YP represents Yield Point, lb/100 ft$^2$.
$^f$Gels represents Gel Strengths, 10 sec/10 min, lb/100 ft$^2$.

Referring to the plastic viscosity (PV) and yield point (YP) values in Table III, it is evident that Soltex ® has the capacity to inhibit the dispersion of clay particles as reflected by the lower PV and YP values in Run 3 versus the higher PV and YP values in Run 2 (base mud with 25 additional ppb bentonite). The 3:1 Soltex- ®/causticized lignite system of Run 4 exhibited a yield point of 8 which reflects an adequate level of clay inhibition. The results in Runs 5 and 6 in Table III suggest that sufficient causticized lignite is present to cause clay dispersion (reflected in the reduced yield points and very low gel strengths) to predominate over clay inhibition. It is desirable to inhibit clay dispersion temporarily, in order to allow drilled solids to reach the surface and be taken out of the system. Therefore the 3:1 system is preferred over the 1:1 system. The low gel strength shows that the causticized lignite alone is not satisfactory at all.

EXAMPLE IV

This example describes the rheology of fresh water, unweighted, non-dispersed drilling muds containing the Soltex ®/causticized lignite additives, the base mud and drilling muds containing either Soltex ® additive or causticized lignite additive.

In each test the additive was present in sufficient quantity to be equivalent to 6 ppb and the test mixtures were stirred for 10 minutes on a Multimixer. The "initial" properties of the samples were determined before aging the samples at 176F for 16 hours. The thermally aged samples were cooled to ambient temperature, stirred for 2 minutes on a Multimixer and the "final" properties were determined. The results are summarized in Table IV.

TABLE IV

Soltex ®/Causticized Lignite Blends in Fresh Water
Unweighted Non-Dispersed Drilling Mud
(6 ppb additive)

| Additive | Run No. | Initial Properties | | | | Final Properties (After Thermal Aging) | | | | | |
|---|---|---|---|---|---|---|---|---|---|---|---|
| | | PV$^d$ | YP$^e$ | Gels$^f$ | pH | PV$^d$ | YP$^e$ | Gels$^f$ | pH | RTWL$^g$ | HTWL$^h$ |
| None (Base Mud)* | 1 | 18 | 11 | 3/12 | 9.4 | 17 | 7 | 2/6 | 8.8 | 10.4 | 41.6 |
| Soltex ®$^a$ | 2 | 26 | 24 | 26/58 | 9.4 | 26 | 21 | 24/45 | 9.1 | 9.8 | 32.4 |
| 3:1 Additive$^b$ | 3 | 25 | 15 | 13/51 | 9.3 | 21 | 9 | 4/20 | 9.0 | 9.0 | 29.6 |
| 1:1 Additive$^c$ | 4 | 24 | 9 | 4/24 | 9.5 | 18 | 6 | 3/5 | 9.1 | 8.4 | 30.0 |
| Causticized Lignite | 5 | 26 | 8 | 2/2 | 9.5 | 20 | 5 | 2/3 | 9.0 | 6.9 | 28.8 |

*Base mud contained about 14 ppb bentonite and 70 ppb kaolin in deionized water with 0.5 ppb quebracho and 0.25 ppb sodium hydroxide.
$^{a,b,c}$See footnotes a, b and c in Example I (Table I).
$^{d,e,f}$See footnotes d, e and f in Example III (Table III).
$^g$RTWL represents API Water Loss at Room temperature (mL/30 min).
$^h$HTWL represents API Water Loss at 300 F. and 500 psi (mL/30 min).

Referring to the room temperature water loss results and the high temperature water loss results, it is apparent that the Soltex ®/causticized lignite blends of Runs 3 and 4 exhibited more effective water loss control than did the Soltex ® system of Run 2. Water loss control is an attribute exhibited by Soltex ® and Soltex ®-containing systems which can be correlated with the prevention of shale disintegration since water loss to the formation promotes shale sloughing from the walls of the borehole during the drilling operation.

Referring to the YP and gel strength values in the final properties, it is evident that Soltex ® additive produced some undesirable effects on the base mud system as reflected by much higher YP and gel strength values in Run 2 versus Run 1. The 3:1 Soltex ®/causticized lignite system of Run 3 and the 1:1 Soltex ®/causticized lignite of Run 4 exhibited PV and gel strength values in the desirable ranges for the system examined. The causticized lignite system of Run 5 exhibited somewhat lower YP and 10 minute gel strength values compared to the YP and 10 minute gel strength values in the base mud system of Run 1 that indicate undesirable dispersion of the system examined.

EXAMPLE V

This example describes the rheology of fresh water weighted lignosulfonate drilling muds containing the Soltex ®/causticized lignite additives, the base mud and drilling muds containing either Soltex ® additive or causticized lignite additive.

In each test the additive was present in sufficient quantity to be equivalent to 6 ppb and the test mixtures were stirred for 10 minutes on a Multimixer. The "initial" properties of the samples were determined before aging the samples at 176F for 16 hours. The thermally aged samples were cooled to ambient temperature, stirred for 2 minutes on a Multimixer and the "final" properties were determined. The results are summarized in Table V.

TABLE V

Soltex ®/Causticized Lignite Blends in Fresh Water
Weighted Lignosulfonate Drilling Mud
(6 ppb additive)

| Additive | Run No. | Initial Properties | | | | Final Properties (After Thermal Aging) | | | | | |
|---|---|---|---|---|---|---|---|---|---|---|---|
| | | $PV^d$ | $YP^e$ | $Gels^f$ | pH | $PV^d$ | $YP^e$ | $Gels^f$ | pH | $RTWL^g$ | $HTWL^h$ |
| None (Based Mud)* | 1 | 42 | 14 | 3/4 | 9.5 | 40 | 11 | 3/3 | 9.1 | 5.8 | 21.6 |
| Soltex ®$^a$ | 2 | 53 | 28 | 4/8 | 9.6 | 49 | 14 | 3/4 | 9.4 | 5.3 | 19.0 |
| 3:1 Additive$^b$ | 3 | 47 | 17 | 3/6 | 9.5 | 46 | 11 | 3/4 | 9.2 | 4.0 | 18.8 |
| 1:1 Additive$^c$ | 4 | 45 | 13 | 3/5 | 9.5 | 45 | 10 | 3/4 | 9.2 | 3.8 | 18.8 |
| Causticized Lignite | 5 | 44 | 11 | 3/4 | 9.6 | 44 | 10 | 3/4 | 9.2 | 3.5 | 18.4 |

*Base Mud contained 22.5 ppb bentonite, 30 ppb P95 rotary clay and 106 ppb barite in deionized water with 5 ppb chrome lignosulfonate and 1 ppb sodium hydroxide.
$^{a,b,c}$See footnotes a, b and c in Example I (Table I).
$^{d,e,f}$See footnotes d, e and f in Example III (Table III).
$^{g,h}$See footnotes g and h in Example IV (Table IV).

Referring to the water loss values in Table V, it is evident that the systems containing the Soltex ®/causticized lignite additives (Runs 3 and 4) exhibited comparable water loss control to the Soltex ® system of Run 2 which was superior to the water loss control exhibited by the base mud in Run 1 containing no additive.

EXAMPLE VI

This example describes the preparation and the water solubility testing of a drilling mud additive disclosed in U.S. Pat. No. 4,420,405. The prior art material was prepared by the reaction of gilsonite (a naturally occurring asphalt), lignite and sodium sulfite in an aqueous solution of sodium hydroxide.

A mixture of gilsonite (55 g) and Tannathin lignite (20 g) was charged to a stirred solution of 5 g sodium hydroxide in 150 mL deionized water. A 20 g sample of sodium sulfite was added to the slurry. This slurry was hot-rolled at about 250F for 3 hours in a closed container before drying the slurry in an oven at about 200F. The dried material was pulverized to a powder. This powder is referred to herein below as "SG".

The water solubility of "SG" and the additives of Table I, viz., Soltex ®, 3:1 Soltex ®/causticized lignite and 1:1 Soltex ®/causticized lignite were determined by the Soxhlet Extraction Method. The sample of SG proved to be only 40% soluble in water whereas Soltex ® and the Soltex ® containing additives noted above exhibited, respectively, 71%, 74% and 76% solubility in water. This relatively low solubility of the SG material in water probably indicates a low degree of sulfonation of the gilsonite. It is generally desirable that water-based drilling mud additives exhibit over 50% solubility in water.

EXAMPLE VII

This example discloses the mud rheology lab test results on the SG (sulfonated gilsonite) drilling mud additive prepared in Example VI. The SG additive was tested in the fresh water unweighted non-dispersed mud used in Example IV and the fresh water weighted lignosulfonate mud used in Example V. Results are summarized below in Tables VI and VII. Results on the systems containing Soltex ® and the Soltex ® blends from Table IV (Runs 2, 3 and 4) and Table V (Runs 2, 3 and 4) are also included for comparison.

TABLE VI

Sulfonated Gilsonite (SG) In Fresh Water
Unweighted Non-Dispersed Drilling Mud*
(6 ppb additive)

| Additive | Run No. | Initial Properties | | | | Final Properties (After Thermal Aging) | | | | | |
|---|---|---|---|---|---|---|---|---|---|---|---|
| | | $PV^d$ | $YP^e$ | $Gels^f$ | pH | $PV^d$ | $YP^e$ | $Gels^f$ | pH | $RTWL^g$ | $HTWL^h$ |
| SG (Example VI) | 1 | 18 | 9 | 3/33 | 10.0 | 20 | 7 | 2/6 | 9.5 | 9.2 | 35.8 |
| Soltex ®$^a$ | 2 | 26 | 24 | 26/58 | 9.4 | 26 | 21 | 24/45 | 9.1 | 9.8 | 32.4 |
| 3:1 Additive$^b$ | 3 | 25 | 15 | 13/51 | 9.3 | 21 | 9 | 4/20 | 9.0 | 9.0 | 29.6 |
| 1:1 Additive$^c$ | 4 | 24 | 9 | 4/24 | 9.5 | 18 | 6 | 3/5 | 9.1 | 8.4 | 30.0 |

*See footnote * in Example IV.
$^{a,b,c}$See footnotes a, b and c in Example I (Table I).
$^{d,e,f}$See footnotes d, e and f in Example III (Table III).
$^{g,h}$See footnotes g and h in Example IV (Table IV).

Referring to the high temperature water loss control results in Table VI, it is evident that the Soltex ®-containing additives of Runs 2, and 4 gave better high temperature water loss control than did the sulfonated gilsonite (SG) system of the prior art (Run 1).

TABLE VII

Sulfonated Gilsonite (SG) In Fresh Water Weighted Lignosulfonate Drilling Mud*
(6 ppb additive)

| Additive | Run No. | Initial Properties | | | | Final Properties (After Thermal Aging) | | | | | |
|---|---|---|---|---|---|---|---|---|---|---|---|
| | | $PV^d$ | $YP^e$ | $Gels^f$ | pH | $PV^d$ | $YP^e$ | $Gels^f$ | pH | $RTWL^g$ | $HTWL^h$ |
| SG (Example VI) | 1 | 36 | 9 | 3/8 | 9.9 | 40 | 9 | 3/3 | 9.6 | 5.0 | 19.6 |
| Soltex ®$^a$ | 2 | 53 | 28 | 4/8 | 9.6 | 49 | 14 | 3/4 | 9.4 | 5.3 | 19.0 |
| 3:1 Additive$^b$ | 3 | 47 | 17 | 3/6 | 9.5 | 46 | 11 | 3/4 | 9.2 | 4.0 | 18.8 |
| 1:1 Additive$^c$ | 4 | 45 | 13 | 3/5 | 9.5 | 45 | 10 | 3/4 | 9.2 | 3.8 | 18.8 |

*See footnote * in Example V.
$^{a,b,c}$See footnotes a, b and c Example I (Table I).
$^{d,e,f}$See footnotes d, e and f in Example III (Table III).
$^{g,h}$See footnotes g and h in Example IV (Table IV).

Referring to the water loss values in Table VII, it is evident that the Soltex ®-containing additives of Runs 2, 3 and 4 gave slightly better water loss control than did the sulfonated gilsonite system of the prior art (Run 1).

While this invention has been described in detail for the purpose of illustration it is not to be construed as limited thereby but is intended to cover all changes and modifications within the spirit and scope thereof.

I claim:

1. A water based well-working fluid comprising an aqueous fluid medium containing clay and a mixture of a sulfonated asphalt and a causticized lignite a weight ratio of said sulfonated asphalt prepared by sulfonating asphalt with a sulfonating agent selected from the group consisting of sulfur trioxide, fuming sulfuric acid, chlorosulfonic acid and concentrated sulfuric acid to said causticized lignite within the range of 3:1 to 1:1, said lignite not being present when said asphalt is sulfonated, said mixture being present in an amount sufficient to reduce foaming and plastic viscosity without significantly affecting lubricity.

2. A water based well-working fluid comprising an aqueous fluid medium containing clay and 0.1 to 10 pounds per barrel of said fluid of a mixture of a sulfonated asphalt and a causticized lignite in a weight ratio of said sulfonated asphalt to said causticized lignite within the range of 3:1 to 1:1, said lignite not being present when said asphalt is sulfonated.

3. A fluid according to claim 2 wherein a weight ratio of said sulfonated asphalt to said causticized lignite is within the range of 3:1 to 1:1.

4. A fluid according to claim 2 wherein said ratio is within 2.5:1 to 1.5:1.

5. A fluid according to claim 1 wherein said fluid also contains quebracho.

6. The fluid according to claim 2 wherein said fluid further comprises sodium carboxymethyl cellulose.

7. A fluid according to claim 2 wherein said sulfonated asphalt is an ammonium salt.

8. A fluid according to claim 2 wherein said sulfonated asphalt is an alkali metal salt.

9. A fluid according to claim 8 wherein said alkali metal is sodium.

10. A fluid according to claim 2 containing bentonite clay and wherein a ratio of said sulfonated asphalt to causticized lignite is within the range of 2.5:1 to 1.5:1.

11. A process comprising sulfonating an asphalt with a sulfonating agent selected from the group consisting of sulfur trioxide, fuming sulfuric acid, chlorosulfonic acid and concentrated sulfuric acid; causticizing lignite; and thereafter combining said thus sulfonated asphalt and said thus causticized lignite to give a composition having a weight ratio of said sulfonated asphalt to said causticized lignite within the range of 3:1 to 1:1.

12. A process according to claim 11 wherein said sulfonated asphalt is neutralized and dried prior to combining with said causticized lignite.

13. A method comprising sulfonating an asphalt with a sulfonating agent selected from the group consisting of sulfur trioxide, fuming sulfuric acid, chlorosulfonic acid and concentrated sulfuric acid; thereafter combining with said thus sulfonated asphalt lignite and a caustic recovering a mixture of sulfonated asphalt and causticized lignite to give a composition having a weight ratio of said sulfonated asphalt to said causticized lignite within the range of 3:1 to 1:1.

14. A method according to claim 13 wherein said sulfonating agent is liquid $SO_3$ and said causticizing agent is caustic NaOH.

15. In a process of drilling a well with well drilling tools, the step of circulating in said well a water based drilling fluid containing clay and a mixture of sulfonated asphalt prepared by sulfonating asphalt with a sulfonating agent selected from the group consisting of sulfur trioxide, fuming sulfuric acid, chlorosulfonic acid and concentrated sulfric acid and a causticized lignite to give a composition having a weight ratio of said sulfonated asphalt to said causticized lignite within the range of 3:1 to 1:1, said mixture being present in an amount within the range of 0.1 to 10 pounds per barrel of said fluid said lignite not being present when said asphalt is sulfonated.

* * * * *